March 20, 1928. Re. 16,905

F. J. ALBERT

DEVICE FOR ELIMINATING THE PRINTING OF IMPRESSIONS ON IMPRESSION CYLINDER PACKINGS

Original Filed Jan. 19, 1927

INVENTOR
Frank J. Albert
BY
Bonnell Howard
ATTORNEYS

Reissued Mar. 20, 1928. Re. 16,905

UNITED STATES PATENT OFFICE.

FRANK J. ALBERT, OF GUTTENBERG, NEW JERSEY, ASSIGNOR TO C. B. COTTRELL & SONS COMPANY, OF WESTERLY, RHODE ISLAND, A CORPORATION OF DELAWARE.

DEVICE FOR ELIMINATING THE PRINTING OF IMPRESSIONS ON IMPRESSION-CYLINDER PACKINGS.

Original No. 1,645,469, dated October 11, 1927, Serial No. 162,136, filed January 19, 1927. Application for reissue filed January 28, 1928. Serial No. 250,304.

This invention relates to the art of printing and has particular relation to an attachment for cylinder printing presses of the McKee four-color type, comprehending a device for protecting the packing of the impression cylinder against receiving an impression from the form, upon failure of a sheet to be fed on to the impression cylinder by the feeder when said feeder is automatically stopped by the automatic throw-off mechanism.

Up to the present time a considerable amount of packing and an enormous number of sheets are wasted due to the failure of a sheet to be fed on to the impression cylinder when the feeder is automatically thrown out of operation by a defective sheet or a defectively fed sheet, which results in the contact of the form with the bare packing. In presses of or similar to the McKee four-color type, the impression cylinder accommodates two circumferentially spaced sheets and when the feeder and press are stopped by the automatic throw-off mechanism the delivery cylinder invariably removes one of the sheets while the impression cylinder due to its momentum continues to revolve a sufficient distance to effect a contact with the form and the printing of an impression upon the impression cylinder packing. In view of the fact that the re-packing of the impression cylinder requires a considerable length of time, it has been found more profitable to start the press after the obstruction has been removed and to run off a sufficient number of sheets to wear off the impression printed on the impression cylinder packing. It is apparent that these impressions are transferred on to the back of the sheets which are subsequently fed over the packing having the impression thereon and these sheets are subsequently segregated and discarded by persons employed for this purpose alone, which entails a further item of expense sought to be eliminated. After a number of superimposed impressions are registered upon the packing, it must of necessity be removed, destroyed and replaced, due to the fact that the superimposed impressions increase the circumference of the impression cylinder to such an extent as to affect the quality of the work produced. When this occurs during the working hours, it is obvious that considerable loss is entailed due to the length of time required for re-packing, while the press must of necessity remain idle.

It is therefore the principal object of the present invention to provide means operable by the automatic throw-off mechanism, which will prevent the sheet on the impression cylinder from being released and removed therefrom by the delivery cylinder when the feeder fails to feed a subsequent sheet to the impression cylinder by virtue of the automatic throw-off mechanism being actuated.

The invention when applied to McKee four-color presses or other presses similar thereto, more specifically comprehends gripper actuating cams which are connected to and are operable by and simultaneously with the automatic throw-off mechanism of the feeder and press to prevent the usual functioning of the grippers of the impression cylinder to release the sheet and the grippers of the delivery cylinder to open and close to take off the sheet, thereby permitting the sheet to remain on the impression cylinder to cover and protect the packing and receive a second impression. In this manner it is obvious therefore that only a single sheet is wasted in lieu of a number of sheets, while the packing is fully protected.

Other objects of the invention reside in the simplicity of construction of the attachment or device, the economy with which the same may be produced and installed without the necessity of materially altering the press, feeder or throw-off mechanism, and the general efficiency derived from the device.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1:
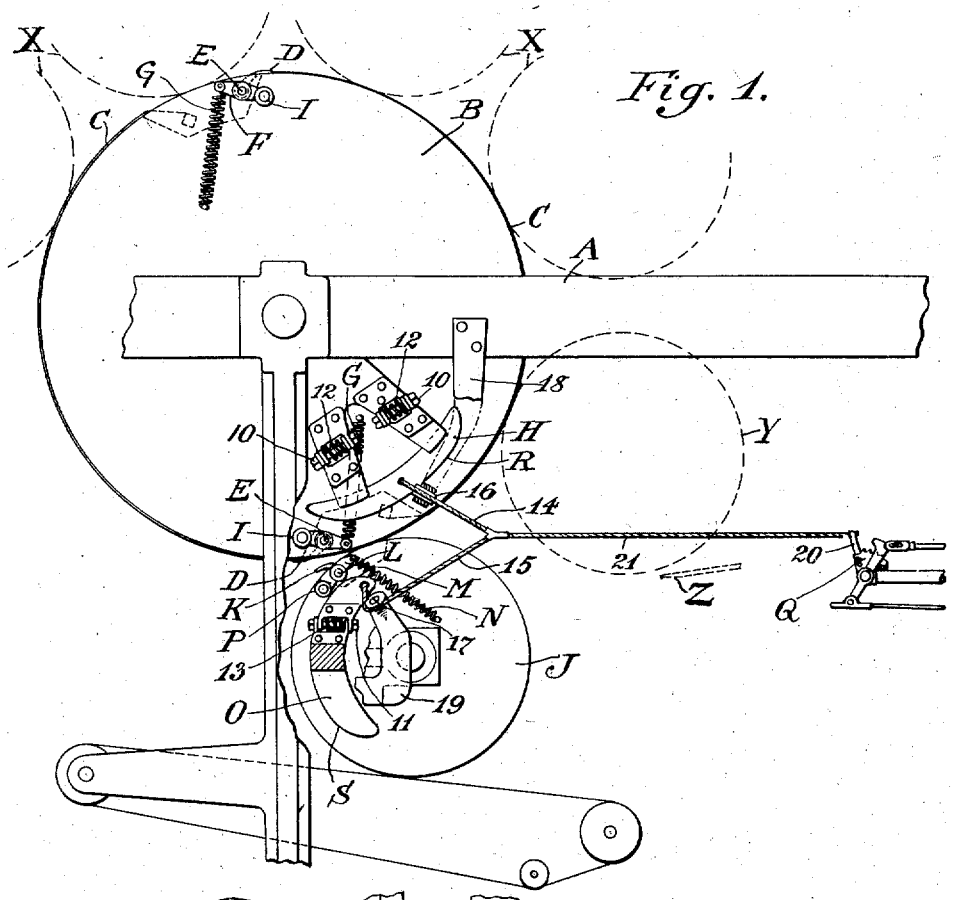
Figure 1 is a fragmentary side view of a press equipped with a device constructed in accordance with one embodiment of the invention and with parts broken away and illustrated in section to disclose the underlying structure.
Figure 2:
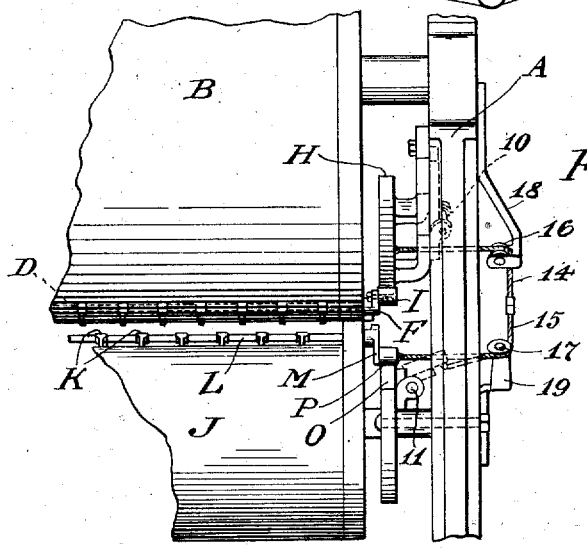
Fig. 2 is a fragmentary end view of the press with the device installed thereon.

Referring to the drawings by characters of reference, A designates the frame of the press, X the form cylinders, Y the feeding cylinder, Z the feeder, and B the impression cylinder, the surface or periphery of which is covered with one or more packing strips C. The impression cylinder B is further provided with one or more sets of grippers D secured to a transverse rock shaft E mounted or journaled in the cylinder and which rock shaft has secured thereto rock arms F normally engaged and actuated by a spring or other suitable means G for closing the grippers D to clamp and maintain the sheets on the impression cylinder and over the packing strips C. At present the framework has rigidly supported therefrom a cam H, which is disposed in the path of movement of cam rollers I carried by the rock arms F so that at a particular point in the cycle of movement of the impression cylinder, the grippers are opened and closed. A delivery cylinder J is mounted in the frame and this cylinder is provided with grippers K which are disposed in staggered relation to the grippers D of the impression cylinder, and which grippers are secured to a transverse rock shaft L mounted on the delivery cylinder J. The rock shaft L has secured thereto a rock arm M which is normally engaged and actuated by a spring or other equivalent means N to swing the grippers to a closed position. A cam O is rigidly supported by the frame A and is disposed in the path of movement of a cam roller P on the rock arm M so that at a particular point in the cycle of movement of the delivery cylinder, the grippers K thereof are opened to receive and are subsequently closed to grip and remove the sheets from the impression cylinder. As heretofore stated up to the present time when the feeder fails to deliver a sheet to the impression cylinder due to the fact that the automatic throw-off mechanism Q is actuated to stop the feeding by reason of a defective sheet being fed or a sheet being defectively fed, the momentum of the press causes the impression cylinder to rotate a sufficient distance to cause the previously fed sheet or one of the previously fed sheets to be removed by the delivery cylinder and the exposed packing strip is presented to and receives a printed impression from the form. The present invention, therefore comprehends means, such as illustrated or any equivalent means, which will prevent the removal of the sheet or one of the sheets when this condition occurs. This means as shown by way of illustration, consists in so mounting the cams H and O that the active surfaces R and S thereof will be disposed out of the path of movement of the cam rollers I and P the instant the automatic throw-off is actuated so that the sheet or one of the sheets on the impression roller, which would ordinarily be released therefrom, gripped and removed by the delivery cylinder J, will not be released, gripped and removed, but will remain on the impression cylinder to cover and protect the packing and receive a second impression from the form.

As specifically illustrated, one way of accomplishing the object and purpose of the invention consists in pivotally mounting the cams H and O on pivots or fulcrums 10 and 11 so that they are capable of being swung laterally to dispose their active faces which ordinarily engage the cam rollers I and P, out of the path of movement of said cam rollers. Springs or other equivalent means 12 and 13 respectively coact with the hinged, fulcrumed, or pivoted cams H and O to dispose the same in a normal position in the path of movement of the cam rollers I and P. In order to provide means for swinging the cams H and O laterally or out of the path of movement of the cam rollers I and P, which means will be actuated by the automatic throw-off mechanism at the instant when said mechanism is actuated, flexible elements 14 and 15, such as cables are attached to the cams or sections of the cams H and O, which are pivotally mounted and said elements are trained around suitable guides, such as sheaves 16 and 17 mounted on brackets 18 and 19 carried by the main frame A of the press. The flexible elements may be separately connected to an arm 20 which is attached to a moving part of the throw-off mechanism or may be joined to a common element or cable 21 which is in turn connected with the arm 20. It is, of course, obvious that when the automatic throw-off mechanism is reset, the tension or pull previously exerted on the cables 14, 15 and 21 will be slackened and the springs 12 and 13 will return the cam H and the movable portion of the cam O to normal active operating position.

In practice on the McKee type of press, it has been found advisable to make only a part or section of the delivery cylinder cam O hinged or pivoted as illustrated, so that the grippers K may open and release a sheet previously removed from the impression roller, by allowing the cam roller P to engage a portion of the active surface D to open and release the grippers but to cause the grippers to be closed prior to reaching the point where they are normally opened to receive the sheet from the impression cylinder. It is manifest that the removal or disposal of the active faces of the cams out of the path of movement of the cam rollers may be accomplished in various and divers ways, and, as heretofore stated, the manner and means shown is intended merely to illustrate one manner or way in which the invention may be reduced to practice and is not intended to limit the invention to the precise details disclosed.

In conclusion and in order that those who are skilled in or familiar with the art to which the invention relates, may appreciate the saving which a device of this character accomplishes, it has been actually observed that a press not equipped with such a device, will, on an average, throw off automatically at least once an hour, and that each time this throw-off occurs, ten or twelve sheets must be discarded and wasted due to the printing on the back from an impression registered on the packing. This results in addition to the waste of sheets, a consequent waste of the packing strips which must be removed and destroyed after a predetermined number of superimposed impressions are registered thereon and a loss entailed by the idleness of the press, without taking into consideration the necessity of employing skilled persons to segregate and discard the ruined sheets. It has been fairly accurately estimated that these losses amount to thousands of dollars a year for each press.

What is claimed is:

1. In a printing press of the character specified which is equipped with a sheet feeder having an automatic throw-off mechanism controlled by said feeder; means operable by and with the throw-off mechanism when actuated for preventing the normal opening of the impression and delivery cylinder grippers to effect the release of the sheets from the impression cylinder and for removal by the delivery cylinder, whereby to cause the sheet on the impression cylinder to remain thereon for protecting the packing and preventing an impression being registered thereon.

2. In a printing press which is equipped with a sheet feeder having an automatic throw-off mechanism, means for mounting the gripper actuating cams of the impression and delivery cylinders to allow for their movement from a normal active position to an inactive position, and means connecting said cams with the automatic throw-off mechanism to dispose the same in their inactive position when the automatic throw-off mechanism is actuated whereby to cause the sheet on the impression cylinder to remain thereon for protecting the packing and preventing an impression being registered thereon.

3. In a printing press which is equipped with a sheet feeder having an automatic throw-off mechanism, means for mounting the gripper actuating cams of the impression and delivery cylinders for movement from a normal active to an inactive position, and means for connecting said cams with the automatic throw-off mechanism to render the said cams inactive when the automatic throw-off mechanism is actuated, whereby to cause the sheet on the impression cylinder to remain thereon and to prevent its removal and delivery therefrom.

4. In a printing press which is equipped with a sheet feeder having an automatic throw-off mechanism, means for mounting the gripper actuating cams of the impression and delivery cylinders to permit of the disposal of the active faces of the cams out of the normal path of movement of the gripper cam rollers, and a connection between said cams and the automatic throw-off mechanism to cause the disposal of the active faces of the cams out of the normal path of movement of the gripper cam rollers, whereby when the automatic throw-off mechanism is actuated, the sheet or sheets on the impression cylinder will be retained thereon and prevented from being delivered therefrom.

5. In a printing press which is equipped with a sheet feeder, an automatic throw-off mechanism controlled by the feeder for stopping said feeder and press when actuated, said press including an impression cylinder, grippers carried by said cylinder, alternately closed and opened to effect the gripping and release of the sheets fed through the press, and means operable by and with the automatic throw-off mechanism when actuated for preventing the normal opening of the grippers and the release of the sheets on the impression cylinder upon failure of the feeder to feed a subsequent sheet whereby when the automatic throw-off mechanism is actuated the sheet or sheets on the impression cylinder will be retained thereon to protect the packing and to prevent an impression being registered on said packing.

6. In a printing press equipped with a feeder for feeding sheets to the impression cylinder, an impression cylinder, a delivery cylinder, means for holding the sheets in place upon said impression cylinder during the period of operation in which the sheets are receiving the printed impression, means on said delivery cylinder for holding the sheets successively in place thereon during the delivery of the sheets by the delivery cylinder as they are received by it from the impression cylinder, automatic throw-off mechanism effective to render said feeder inoperative, and means whereby in the operation of said throw-off mechanism, the sheet or sheets immediately receiving or ready to receive the printed impression, are maintained in place upon the impression cylinder until the stoppage which has caused the operation of the throw-off mechanism is corrected.

7. In a printing press equipped with a sheet feeding mechanism having an automatic throw-off mechanism for stopping the feeder and press, impression and delivery cylinders, normally closed grippers carried by said cylinders, coacting means connected with the grippers and carried by the press respectively for opening the grippers to feed and release the sheets fed through the press, and means operable by and with the automatic throw-off mechanism when actuated for preventing coaction of the coacting means to open the grippers of the impression and delivery cylinders whereby to prevent the release and removal of the sheet on the impression cylinder by the delivery cylinder upon failure of the feeder to feed a subsequent sheet.

8. In a printing press which is equipped with a feeder having an automatic throw-off mechanism, means for mounting the gripper actuating cams of the impression and delivery cylinders to allow for lateral swinging movement of the same from a normal active position to an inactive position, and means of connection between the laterally movable portions of said cams and the automatic throw-off mechanism for instantly moving the same laterally from their active to their inactive position when the automatic throw-off mechanism is actuated whereby to prevent the normal operation of the grippers and to cause the sheet on the impression cylinder to remain thereon to protect the packing and to prevent an impression being registered on said packing.

9. In a printing press of the character specified, means for receiving and presenting a sheet to be printed to the printing forms, and automatic means controlled by the sheet feeder for preventing the normal operation of said sheet-receiving and presenting means to cause the retention of the last printed sheet on the sheet-receiving and presenting means in event of failure of the sheet feeder to feed a subsequent sheet thereto whereby to protect the sheet-receiving and presenting means from directly receiving an impression from the printing forms.

10. In a printing press of the character specified which is equipped with a sheet feeder, an automatic throw-off mechanism and an impression cylinder rotating on a fixed axis, means operated automatically when the throw-off mechanism is actuated, to cause the impression cylinder to retain the sheet beyond its delivery point, for protecting the cylinder packing from receiving an impression thereon.

11. In a printing press of the character specified which is equipped with a sheet feeder, an automatic throw-off mechanism controlled by said feeder and an impression cylinder rotating on a fixed axis, means operated by the throw-off mechanism to cause the impression cylinder to retain the sheet beyond its delivery point, for protecting the cylinder packing from receiving an impression thereon.

12. In a printing press of the character specified which is equipped with a sheet feeder, an automatic throw-off mechanism and an impression cylinder rotating in a fixed relationship to its form, means operated automatically when the throw-off mechanism is actuated, to cause the impression cylinder to retain the sheet beyond its delivery point, for protecting the cylinder packing from receiving an impression thereon.

13. In a printing press of the character specified which is equipped with a sheet feeder, an automatic throw-off mechanism controlled by said feeder and an impression cylinder rotating in a fixed relationship to its form, means operated by the throw-off mechanism to cause the impression cylinder to retain the sheet beyond its delivery point, for protecting the cylinder packing from receiving an impression thereon.

14. In a printing press of the character specified, means bearing a fixed relationship to the printing forms for receiving and presenting a sheet to be printed to the printing forms, and automatic means controlled by the sheet feeder for preventing the normal operation of the sheet receiving and presenting means in the event of the failure of the feeder to feed a sheet thereto.

15. In a printing press of the character specified, means bearing a fixed relationship to the printing forms for receiving and presenting a sheet to be printed to the printing forms, and automatic means controlled by the sheet feeder for preventing the normal operation of said sheet receiving and presenting means to cause the retention of the last printed sheet on the sheet receiving and presenting means in the event of failure of the sheet feeder to feed a subsequent sheet thereto, whereby to protect the sheet receiving and presenting means from directly receiving an impression from the printing forms.

16. In a printing press of the character specified which is equipped with a sheet feeder having an automatic throw-off mechanism controlled by said feeder, means operable by and with the throw-off mechanism when actuated, for preventing the normal opening of the impression cylinder grippers to effect the release of the sheets from the impression cylinder, whereby to cause the sheet on the impression cylinder to remain thereon for protecting the packing and preventing an impression being registered thereon.

17. In a printing press which is equipped with a sheet feeder having an automatic throw-off mechanism, means for mounting the gripper actuating cam of the impression cylinder to allow for its movement from a normal active position to an inactive position, and means connecting said cam with the automatic throw-off mechanism to dispose the cam in its inactive position when the automatic throw-off mechanism is actuated, whereby to cause the sheet on the impression cylinder to remain thereon for protecting the packing and preventing an impression being registered thereon.

18. In a printing press which is equipped with a sheet feeder having an automatic throw-off mechanism, means for mounting the gripper actuating cam of the impression cylinder for movement from a normal active to an inactive position, and means for connecting said cam with the throw-off mechanism to render the said cam inactive when the automatic throw-off mechanism is actuated, whereby to cause the sheet on the impression cylinder to remain thereon.

19. In a printing press which is equipped with a sheet feeder having an automatic throw-off mechanism, means for mounting the gripper actuating cam of the impression cylinder to permit of the disposal of the active face of the cam out of the normal path of movement of the gripper cam roll, and a connection between said cam and the automatic throw-off mechanism to cause the disposal of the active face of the cam out of the normal path of movement of the gripper cam roll, whereby when the automatic throw-off mechanism is actuated the sheet or sheets on the impression cylinder will be retained thereon.

20. In a printing press equipped with a feeder for feeding sheets to the impression cylinder, an impression cylinder, means for holding the sheets in place upon said impression cylinder during the period of operation in which the sheets are receiving the printed impression automatic throw-off mechanism effective to render said feeder inoperative, and means whereby in the operation of said throw-off mechanism, the sheet or sheets immediately receiving or ready to receive the printed impression are maintained in place upon the impression cylinder until the stoppage which has caused the operation of the throw-off mechanism is corrected.

21. In a printing press equipped with a sheet feeding mechanism having an automatic throw-off mechanism for stopping the feeder and press, an impression cylinder, normally closed grippers carried thereby, coacting means connected with the grippers and carried by the press respectively for opening the grippers to receive and release the sheets fed through the press, and means operable by and with the automatic throw-off mechanism when actuated, for preventing coaction of the coacting means to open the grippers of the impression cylinder, whereby to prevent the release of the sheet on the impression cylinder upon failure of the feeder to feed a subsequent sheet.

22. In a printing press which is equipped with a feeder having an automatic throw-off mechanism, means for mounting the gripper actuating cam of the impression cylinder to allow for a lateral swinging movement of the same from a normal inactive position to an inactive position, and means of connection between the laterally movable portion of said cam and the automatic throw-off mechanism for instantly moving the movable portion of the cam laterally from its active to its inactive position when the automatic throw-off mechanism is actuated, whereby to prevent the normal operation of the grippers and to cause the sheet on the impression cylinder to remain thereon to protect the packing and to prevent an impression being registered on said packing.

In testimony whereof I affix my signature.

FRANK J. ALBERT.